United States Patent
Nohara

(10) Patent No.: US 9,726,152 B2
(45) Date of Patent: Aug. 8, 2017

(54) ROTATION DRIVING MECHANISM FOR WINDMILL

(71) Applicant: NABTESCO CORPORATION, Tokyo (JP)

(72) Inventor: Osamu Nohara, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 238 days.

(21) Appl. No.: 14/742,155

(22) Filed: Jun. 17, 2015

(65) Prior Publication Data

US 2015/0377219 A1    Dec. 31, 2015

(30) Foreign Application Priority Data

Jun. 27, 2014 (JP) ................. 2014-132259

(51) Int. Cl.
| | |
|---|---|
| *F03D 1/06* | (2006.01) |
| *F03D 11/00* | (2006.01) |
| *F03D 11/02* | (2006.01) |
| *F03D 11/04* | (2006.01) |
| *F16H 25/02* | (2006.01) |

(Continued)

(52) U.S. Cl.
CPC ............... *F03D 11/02* (2013.01); *F03D 1/06* (2013.01); *F03D 13/20* (2016.05); *F03D 15/00* (2016.05); *F03D 80/88* (2016.05); *F16H 25/02* (2013.01); *F05B 2260/4031* (2013.01);
(Continued)

(58) Field of Classification Search
CPC ........ F03D 1/06; F03D 11/02; F03D 11/0075; F03D 11/04; F03D 13/20; F03D 15/00; F03D 80/88; F16H 25/02; F05B 2260/4031; Y02E 10/721; Y02E 10/722; Y02E 10/726
See application file for complete search history.

(56) References Cited

U.S. PATENT DOCUMENTS 5,187,994 A     2/1993  Hirai et al.
5,823,050 A *  10/1998  Takenaka ............... F16H 19/043
                                                               74/116

(Continued)

FOREIGN PATENT DOCUMENTS

EP    0 612 936 A1    8/1994
JP    2013-083247 A   5/2013

OTHER PUBLICATIONS

Extended European Search Report as issued in European Patent Application No. 15170475.6, dated Oct. 19, 2015.

*Primary Examiner* — Igor Kershteyn
(74) *Attorney, Agent, or Firm* — Pillsbury Winthrop Shaw Pittman LLP

(57) ABSTRACT

A rotation driving mechanism for windmill (1) includes an annular track part (2), a rotation driving part (11), and a plurality of swinging parts (15). The annular track part (2) is disposed on one of a base-side structure and a rotation-side structure, and has a circumferential wall part (4) and first teeth (7). The rotation driving part (11) is fixed on the other of the base-side structure and the rotation-side structure. Each swinging part (15) has a swinging part body (16a) and second teeth (16b). When a rotating shaft (13) of the rotation driving part (11) is rotated so that the swinging parts (15) are swung with maintaining a predetermined phase difference thereamong, the swinging parts (15) are relatively moved with respect to the annular track part (2).

8 Claims, 10 Drawing Sheets

(51) Int. Cl.
  *F03D 80/80* (2016.01)
  *F03D 15/00* (2016.01)
  *F03D 13/20* (2016.01)

(52) U.S. Cl.
  CPC ........... *Y02E 10/721* (2013.01); *Y02E 10/722* (2013.01); *Y02E 10/726* (2013.01)

(56) References Cited

U.S. PATENT DOCUMENTS

| | | | |
|---|---|---|---|
| 7,331,761 B2 * | 2/2008 | Hansen | F03D 7/0224 415/2.1 |
| 2011/0142617 A1 | 6/2011 | Mashue et al. | |
| 2014/0341740 A1 * | 11/2014 | Pasquet | F03D 7/0224 416/155 |

* cited by examiner

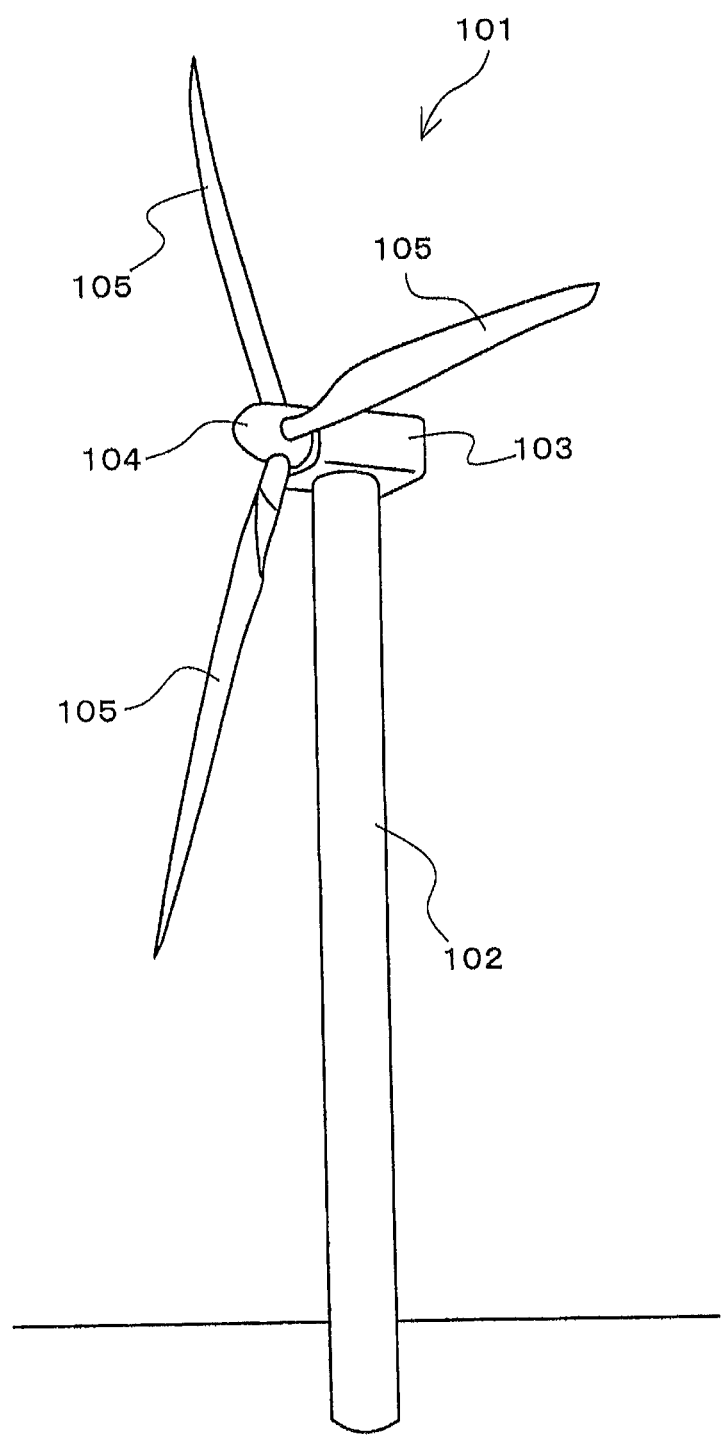
F I G. 1

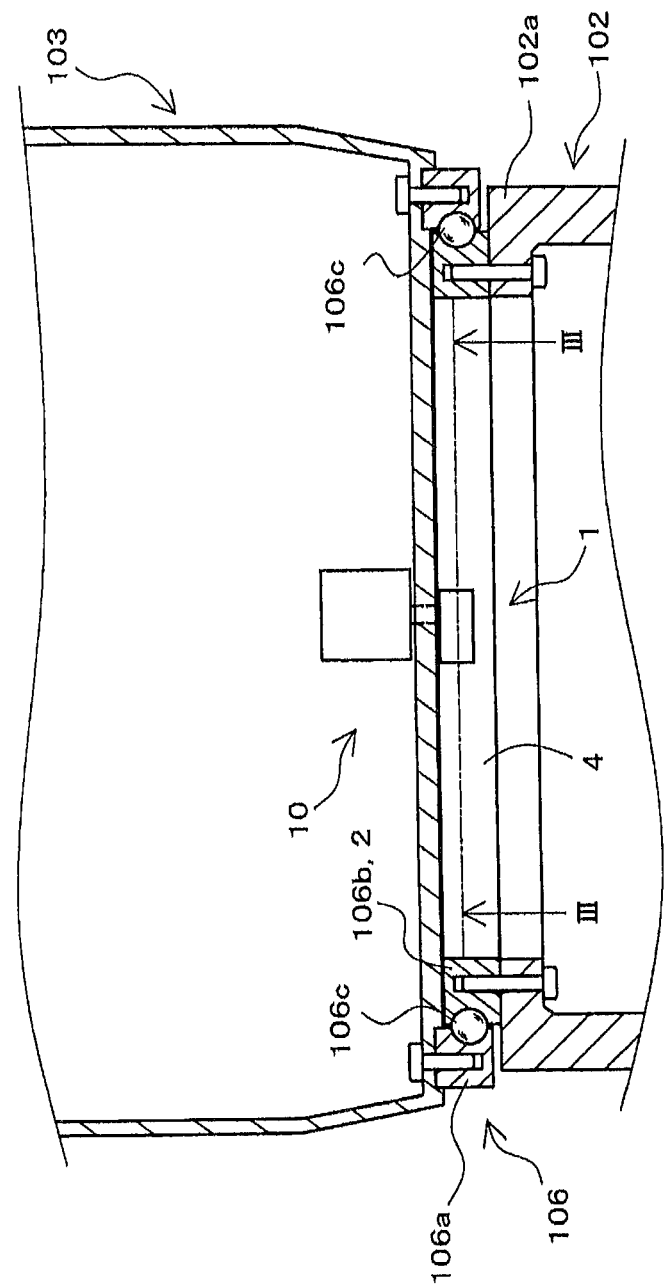
F I G. 2

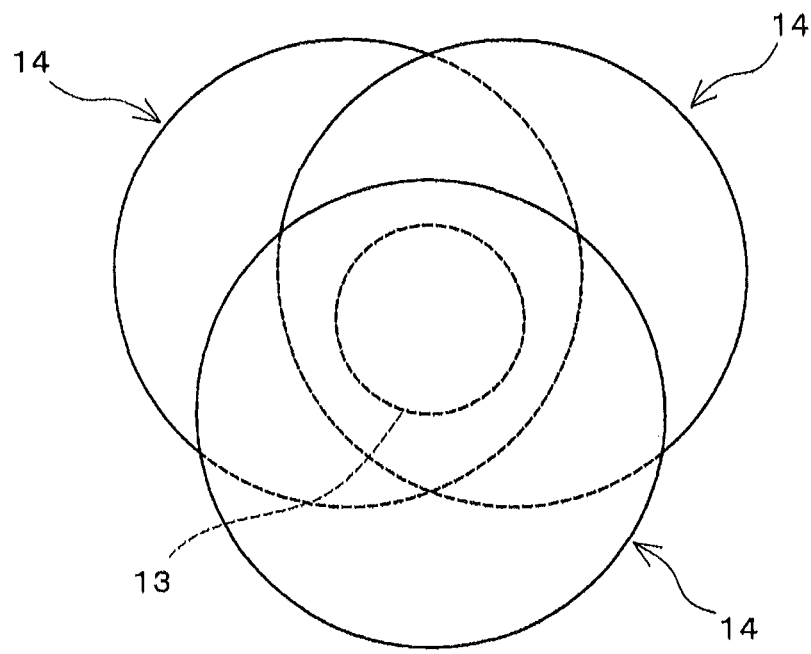
F I G. 6
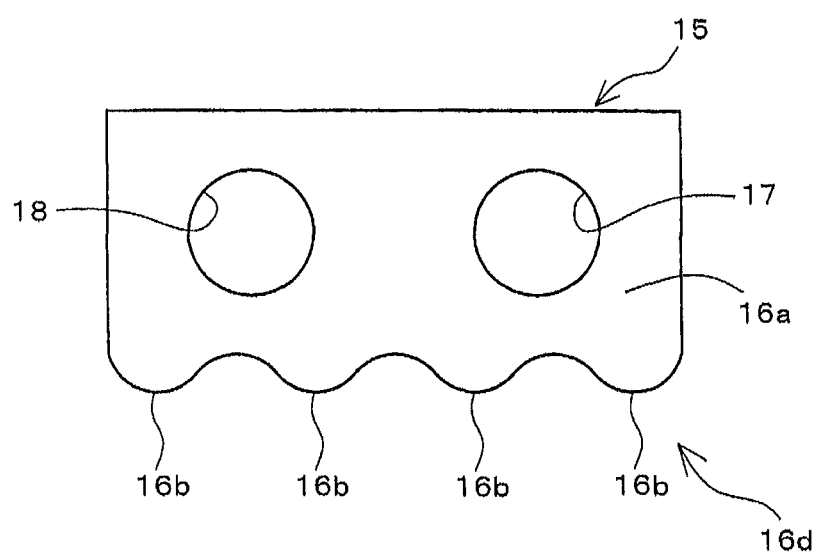
F I G. 7

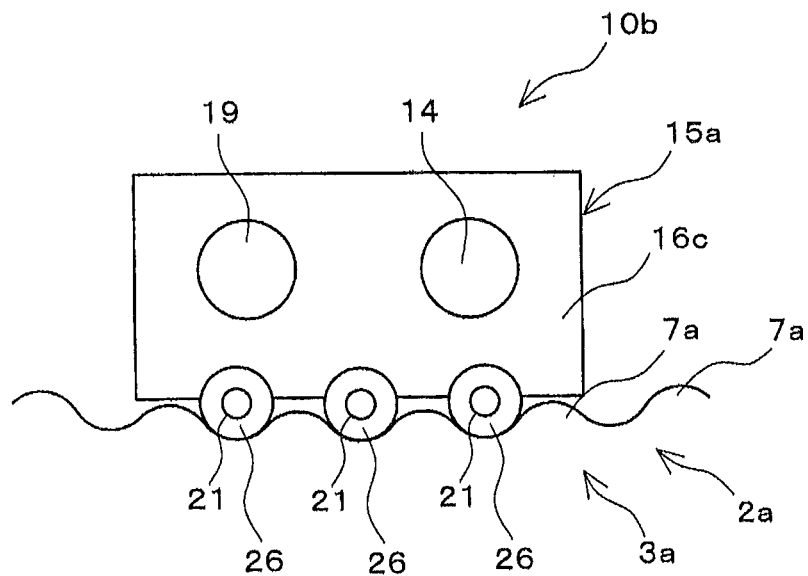
F I G. 10
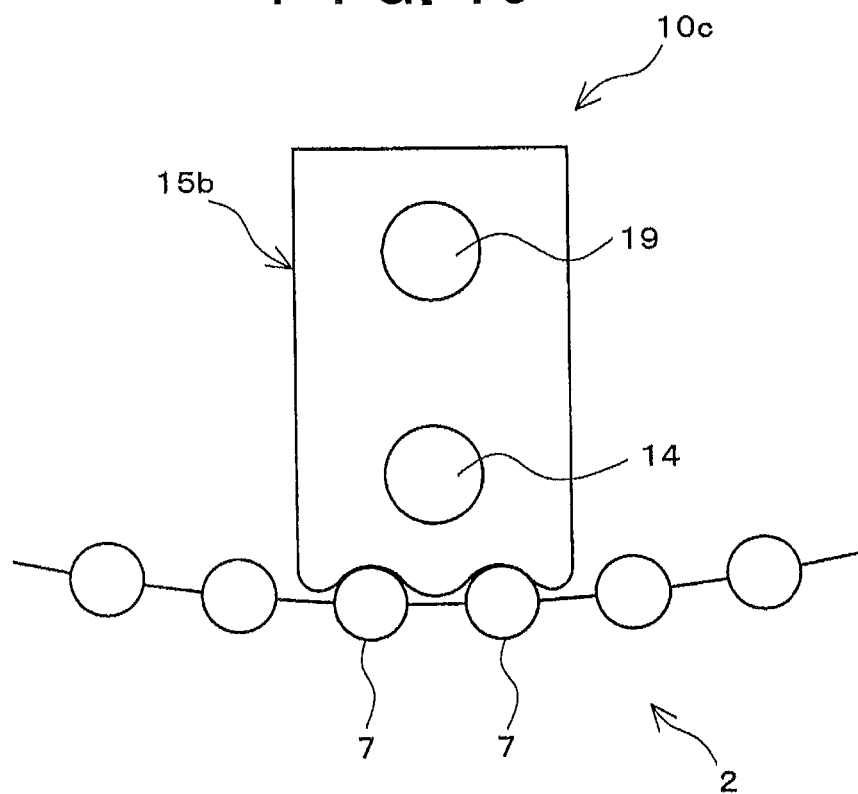
F I G. 11

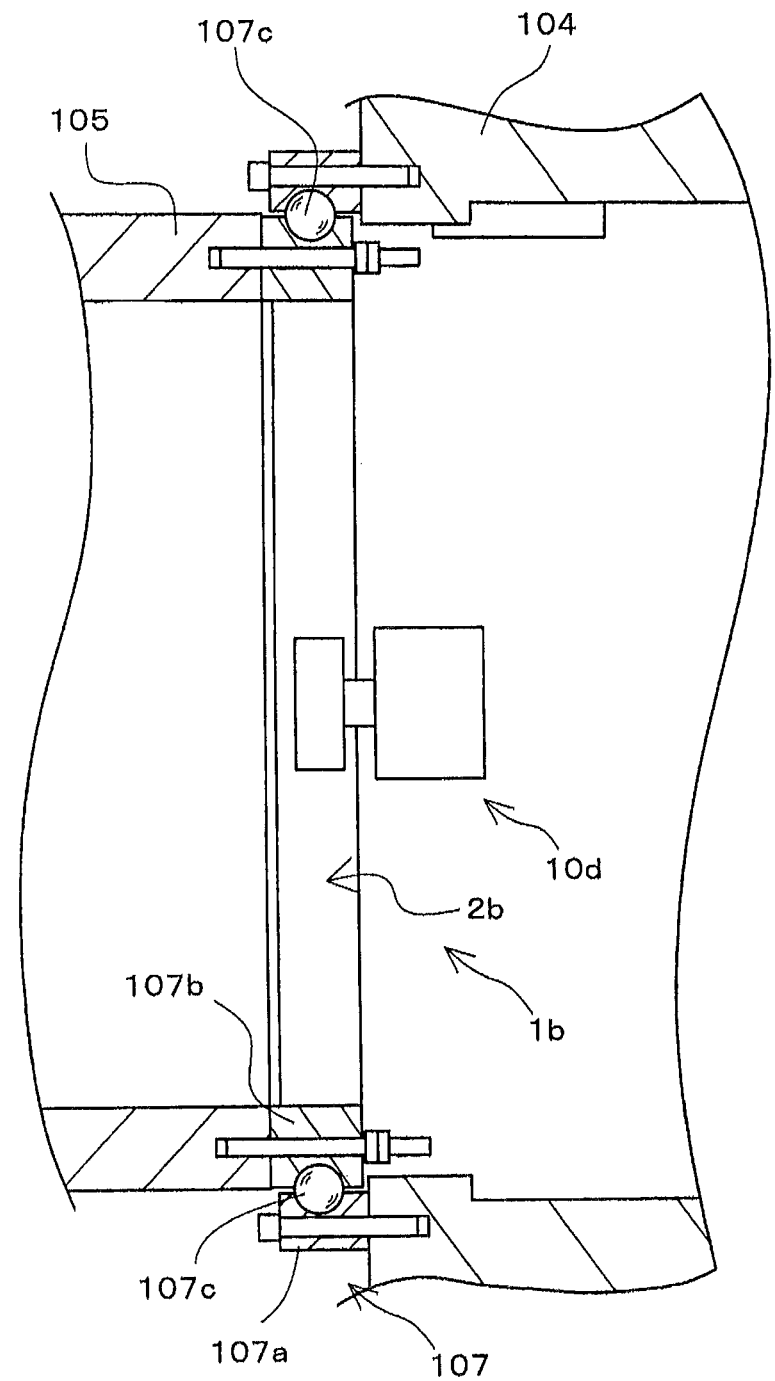
F I G. 12

ROTATION DRIVING MECHANISM FOR WINDMILL

CROSS-REFERENCE TO RELATED APPLICATIONS

This application is based upon and claims the benefit of priority from Japanese Patent Application No. 2014-132259, filed Jun. 27, 2014; the entire contents of which are incorporated herein by reference.

BACKGROUND OF THE INVENTION

Field of the Invention

The present invention relates to a rotation driving mechanism for windmill, which is used in a windmill including a base-side structure and a rotation-side structure that is rotatable with respect to the base-side structure, so as to rotate the rotation-side structure with respect to the base-side structure.

Background Art

As a windmill used as a wind turbine generator, a windmill including a nacelle and blades have been conventionally used. The nacelle is rotatably disposed on top of a tower, and a generator and so on is disposed in the nacelle. The blades are disposed rotatably with respect to a hub provided on the nacelle. In such a windmill, a rotation driving mechanism configured to rotate the nacelle (rotation-side structure) with respect to the tower (base-side structure) is used.

For example, JP2013-083247A discloses a rotation driving mechanism including a yaw driving mechanism fixed on a nacelle and a ring gear fixed on a tower, wherein a pinion of the yaw driving mechanism is meshed with the ring gear. In the rotation driving mechanism, when the yaw driving mechanism work, the pinion makes a rotation while being meshed with the ring gear as well as makes a revolution, so that the nacelle (rotation-side structure) is rotated with respect to the tower (base-side structure).

In the aforementioned rotation driving mechanism, since the number of teeth of the pinion and the ring gear, which simultaneously contact with each other, is small, a large stress is generated in a drive transmission area between the pinion and the ring gear. This not only reduces a mechanism life of the rotation driving mechanism, but also impairs a drive transmission capacity of the mechanism. On the other hand, in order to elongate the mechanism life and to improve the drive transmission capacity, the rotation driving mechanism has to be enlarged in size.

SUMMARY OF THE INVENTION

The present invention has been made for solving the above problem. The object of the present invention is to provide a small-size rotation driving mechanism for windmill having an excellent durability and an excellent drive transmission capacity.

(1) In order to solve the above problem, the rotation driving mechanism according to one aspect of the present invention is a rotation driving mechanism for windmill for use in a windmill including a base-side structure and a rotation-side structure that is rotatable with respect to the base-side structure, so as to rotate the rotation-side structure with respect to the base-side structure, the rotation driving mechanism for windmill comprising:

an annular track part provided in one structure of the base-side structure and the rotation-side structure, the annular track part having a circumferential wall part, and first teeth that are arranged along a circumferential direction of the circumferential wall part such that a facewidth direction of each first tooth extends along a direction in parallel with a central axis direction of the circumferential wall part;

a rotation driving part having a rotatable rotating shaft, the rotation driving part being fixed on the other structure of the base-side structure and the rotation-side structure; and a swinging unit including swinging parts each having a meshing part to be meshed with a part of the first teeth, and a swinging part body provided with the meshing part, wherein the swinging parts are arranged along the facewidth direction of the first teeth, and the swinging unit is configured to be relatively moved with respect to the ring gear in a circumferential direction of the ring gear, when the rotating shaft is rotated so that the swinging parts are swung with maintaining a predetermined phase difference thereamong, wherein the meshing part includes second teeth to be meshed with the first teeth.

In this constitution, when the annular track part is disposed on the base-side structure, and the rotation driving part and the swinging unit are disposed on the rotation-side structure (i.e., when the base-side structure is the one structure, and the rotation-side structure is the other structure), the rotation driving mechanism for windmill is operated as follows. Specifically, the swinging parts are swung with maintaining a predetermined phase difference thereamong, while the second teeth in each swinging part are meshed with a part of the first teeth, so that the swinging parts are moved along a circumferential direction of the annular track part disposed on the base-side structure. Thus, the rotation-side structure, which is a structure on which the swinging parts are fixed, is rotated with respect to the base-side structure.

On the other hand, when the annular track part is disposed on the rotation-side structure and the rotation driving part, and the swinging parts are disposed on the base-side structure (i.e., when the rotation-side structure is the one structure, and the base-side structure is the other structure), the rotation driving mechanism for windmill is operated as follows. Specifically, when the rotating shaft of the rotation driving part is rotated so that the swinging parts are swung with maintaining a predetermined phase difference thereamong, the annular track part disposed on the rotation-side structure is rotated. Thus, the rotation-side structure is rotated with respect to the base-side structure.

Both in the aforementioned constitutions, the rotation-side structure is rotated with respect to the base-side structure, while the first teeth and the second teeth are meshed with each other.

Namely, in this constitution, during the rotation of the rotation-side structure, the number of meshed teeth between the swinging unit and the annular track part can be increased. Thus, since a stress acting on a contact portion between the first teeth and the second teeth can be reduced, the risk in which the rotation driving mechanism is damaged can be reduced, and a mechanism strength can be enhanced. In addition, according to this constitution, since the number of meshed teeth can be increased, it is not necessary to enlarge the mechanism in size in order to elongate a mechanism life expectancy.

Therefore, according to this constitution, a small-size rotation driving mechanism for windmill having an excellent durability and an excellent drive transmission capacity can be provided.

(2) Preferably, the first teeth are rotatably held with respect to the circumferential wall part, or the second teeth are rotatably held with respect to the swinging part body.

According to this constitution, under conditions in which the first teeth and the second teeth are meshed with each other, when a force of the first teeth acts on the second teeth or when a force of the second teeth acts on the first teeth, the teeth that are rotatably held are rotated. Namely, according to this constitution, since a frictional force can be reduced by the slidable contact between the first teeth and the second teeth, a stress acting on a contact portion between the first teeth and the second teeth can be further reduced. Thus, the durability and the drive transmission capacity of the rotation driving mechanism can be further improved.

(3) More preferably, the annular track part has an inner circumferential wall serving as the circumferential wall part. According to this constitution, the swinging parts can be swung along the inner circumferential wall.

(4) Preferably, the annular track part has an outer circumferential wall serving as the circumferential wall part. According to this constitution, the swinging parts can be swung along the outer circumferential wall.

(5) Preferably, the circumferential wall part is provided with grooves arranged along the circumferential direction of the circumferential wall part such that a longitudinal direction of each groove extends along the direction in parallel with the central axis direction of the circumferential wall part, each groove having a bottom part whose sectional shape in a plane perpendicular to the longitudinal direction is circular arc shape; and each of the first teeth is accommodated in one groove of the grooves such that the facewidth direction of the first tooth extends along the longitudinal direction of the groove, each of the first teeth being pin member that is rotatable while sliding with respect to the one groove.

According to this constitution, the first teeth can be easily made rotatable with respect to the circumferential wall part, with a simple constitution.

(6) Preferably, the second tooth is a roller that is rotatable about a shaft part attached to the swinging part body such that an axial direction thereof extends along the facewidth direction.

According to this constitution, the second teeth can be easily made to be rotatable with respect to the swinging part body, with a simple constitution.

(7) Preferably, the rotation driving mechanism for windmill further comprises:

a plurality of the swinging units; and a plurality of the rotation driving parts that are correspondingly provided on the respective swinging units, so as to swing the swinging parts of the respective swinging units.

According to this constitution, since the rotation-side structure can be rotated by a plurality of the swinging units, a load that acts during a rotation of the rotation-side structure can be dispersed to the plurality of swinging units. Thus, the risk in which the swinging units are damaged can be reduced.

(8) Preferably, the rotation driving mechanism for windmill is used in a tower as the base-side structure, and a nacelle as the rotation-side structure.

According to this constitution, the rotation driving mechanism for windmill can be used as a yaw driving apparatus for rotating the nacelle with respect to the tower.

According to the present invention, a small-size rotation driving mechanism for windmill having an excellent durability and an excellent drive transmission capacity can be provided.

BRIEF DESCRIPTION OF THE DRAWINGS

FIG. 1 is a perspective view showing a windmill to which a driving apparatus for windmill according to this embodiment of the present invention can be applied.

FIG. 2 is a sectional view showing in enlargement a movable part where a nacelle is disposed rotatably with respect to a tower, showing an arrangement state of a rotation driving mechanism for windmill in the movable part.

FIG. 6 is a view seen from a direction of an arrow VI in FIG. 5, showing only a rotating shaft and a first eccentric part.

FIG. 7 is a plan view schematically showing a shape of a swinging part.

FIG. 10 is a view schematically showing a driving unit (excluding an electric motor) of the rotation driving mechanism for windmill according to a modification example.

FIG. 11 is a view schematically showing a driving unit (excluding an electric motor) of the rotation driving mechanism for windmill according to a modification example.

FIG. 12 is a view schematically showing a rotation driving mechanism for windmill according to a modification example, wherein the rotation driving mechanism for windmill is applied to a hub as a base-side structure and a blade as a rotation-side structure.

EMBODIMENT FOR CARRYING OUT THE INVENTION

Figure 3:
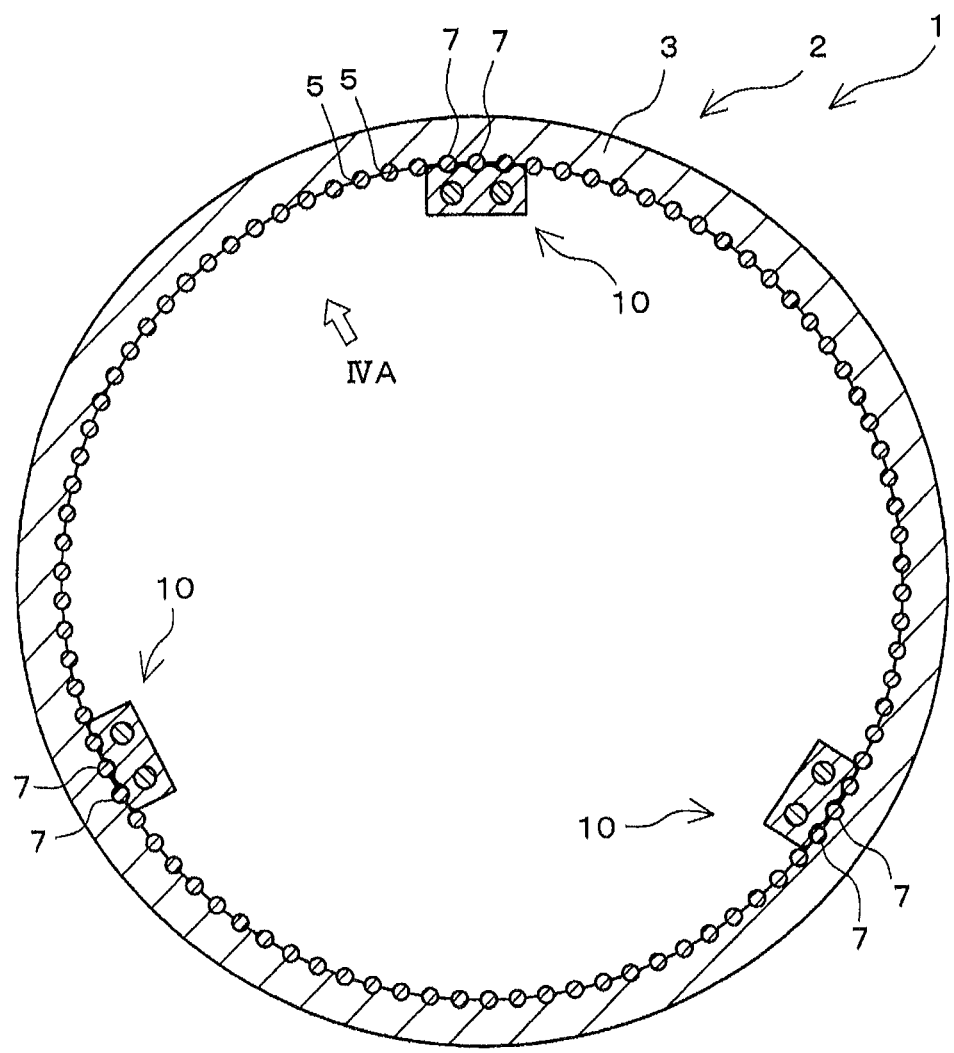
FIG. 3 is a sectional view taken along a line III-III in FIG. 2.

An embodiment for carrying out the present invention will be described herebelow, with reference to the drawings.

FIG. 1 is a perspective view showing a windmill 101 to which a rotation driving mechanism for windmill 1 according to the embodiment of the present invention is applied. As shown in FIG. 1, the windmill 101 includes a tower 102, a nacelle 103, a hub 104 as a main shaft part, a blade 105 and so on. The tower 102 is disposed to extend vertically upward from a ground. The nacelle 103 is disposed rotatably with respect to an upper part of the tower 102. The nacelle 103 is disposed to be rotated (turned) in a horizontal plane by the below-described rotation driving mechanism for windmill 1. A transmission axis, a generator, etc., not shown, are located inside the nacelle 103. The hub 104 is connected to the transmission axis, and is disposed rotatably with respect to the nacelle 103. A plurality of the blades 105 (three blades 105 in this embodiment) are attached to the hub 104 to radially extend equiangularly. Each blade 105 is disposed on the hub 104 such that the blade 105 is rotatable with respect to the hub 104 about a shaft center of a shaft part of the blade 105. The blade 105 is configured such that, when the blade 105 is driven in rotation by a not-shown pitch driving apparatus, a pitch angle of the blade 105 varies.

FIG. 2 is a sectional view showing in enlargement a movable part of the windmill 101, where the nacelle 103 is disposed rotatably with respect to the tower 102. FIG. 3 is a sectional view taken along a line in FIG. 2.

A bearing 106 is provided between the nacelle 103 and the tower 102. The bearing 106 includes an outer race part 106a, an inner race part 106b, and a plurality of rolling elements 106c. The outer race part 106a is fixed on the nacelle 103. The inner race part 106b is fixed on a tower body 102a. The rolling elements 106c are formed of spherical members, for example, and are rotatably located between an inner circumferential side of the outer race part 106a and an outer circumferential side of the inner race part 106b. Thus, the nacelle 103 is rotatable with respect to the tower 102, and a load of the nacelle 103 to the tower 102 is borne by the bearing 106.

The tower 102 includes the tower body 102a and a ring gear 2. The ring gear 2 is formed by the inner race part 106b of the aforementioned bearing 106. In FIG. 2, illustration of teeth (first teeth 7) of the ring bear 2 is omitted.

As shown in FIG. 3, a plurality of driving units 10 are provided on the movable part of the windmill 101. By performing a predetermined operation, the driving units 10 rotate the nacelle 103 with respect to the tower 102. A constitution of the driving unit 10 will be described in more detail below.

Constitution of Rotation Driving Mechanism for Windmill

As shown in FIGS. 2 and 3, the rotation driving mechanism for windmill 1 includes the ring gear 2 and the plurality of driving units 10 (three driving units 10 in this embodiment).

Constitution of Ring Gear

The ring gear 2 is a track part (annular track part) along which the driving units 10 are moved. The ring gear 2 includes a ring part 3 and a plurality of first teeth 7.

Figure 4A:
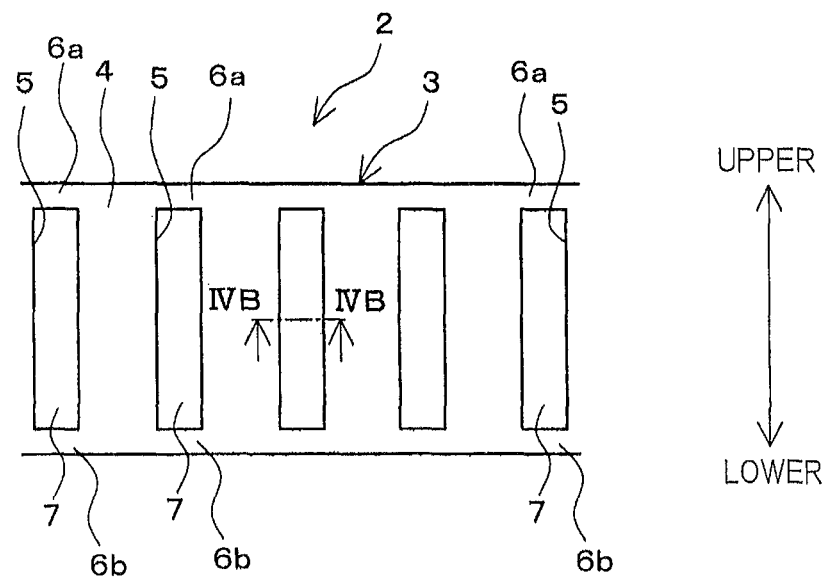
FIG. 4A is a view seen from an arrow IVA in FIG. 3.
Figure 4B:
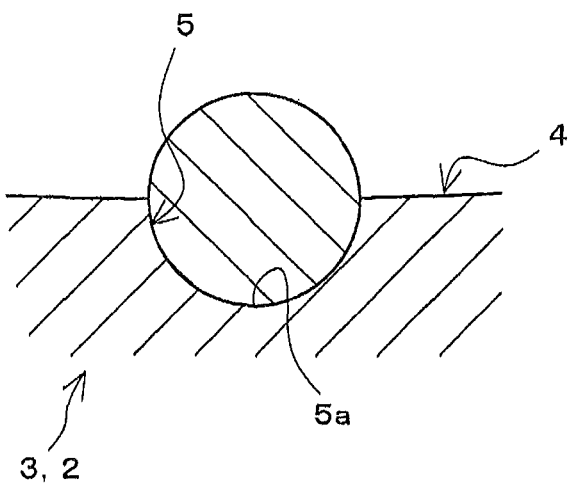
FIG. 4B is a sectional view taken along a IVB-IVB line in FIG. 4A.

FIG. 4A is a view seen from an arrow IVA in FIG. 3, showing a part of the ring gear 2 seen from an inner circumferential side. FIG. 4B is a sectional view taken along a IVB-IVB line in FIG. 4A. As shown in FIGS. 2, 3 and so on, the ring part 3 is formed to have an annular shape having flat upper and lower surfaces. An inner circumferential surface 4 of the ring part 3 is provided with a plurality of grooves 5 each extending in a direction in which the inner circumferential surface 4 stands (a central axis direction of the inner circumferential wall, an up and down direction in FIG. 4A). The grooves 5 are formed at equal intervals therebetween (intervals of e.g., 2 degrees) along the circumferential direction of the inner circumferential wall 4. However, not limited thereto, the grooves 5 may be arranged at any circumferential interval degree. Note that FIG. 3 shows the circumferential interval between the grooves 5 is 4 degrees, in order to avoid complexity of the drawings.

As shown in FIG. 4B, each groove 5 has a bottom part 5a whose sectional shape in a plane perpendicular to the direction in which the groove 5 extends is a circular arc shape. In addition, as shown in FIG. 4A, each groove 5 extends from a position slightly below an upper end of the inner circumferential wall 4 to a position slightly above a lower end of the inner circumferential wall 4. Thus, an upper piece part 6a and a lower piece part 6b are provided on an upper side and a lower side of each groove 5.

Each first tooth 7 is formed of a pin member having a round bar shape. A length of the first tooth 7 is substantially equal to a length of the groove 5, and an external diameter of the first tooth 7 is substantially equal to a diameter of the bottom part 5a of the groove 5. The first tooth 7 is accommodated in the groove 5 in such a manner that the longitudinal direction of the first tooth 7 conforms to the longitudinal direction of the groove 5. Thus, the first tooth 7 is rotatable while sliding with respect to the bottom part 5a of the groove 5, under conditions in which the first tooth 7 is held between the upper piece part 6a and the lower piece part 6b formed in the upper side and the lower side of the groove 5.

Constitution of Driving Unit

As shown in FIG. 3, when viewed from the up and down direction, the plurality of driving units 10 (three driving units 10 in this embodiment) are arranged inside the tower 102 and the nacelle 103 at equal intervals therebetween (at intervals of 120 degrees in this embodiment). The respective driving units 10 are the same with one another in constitution.

Figure 5:
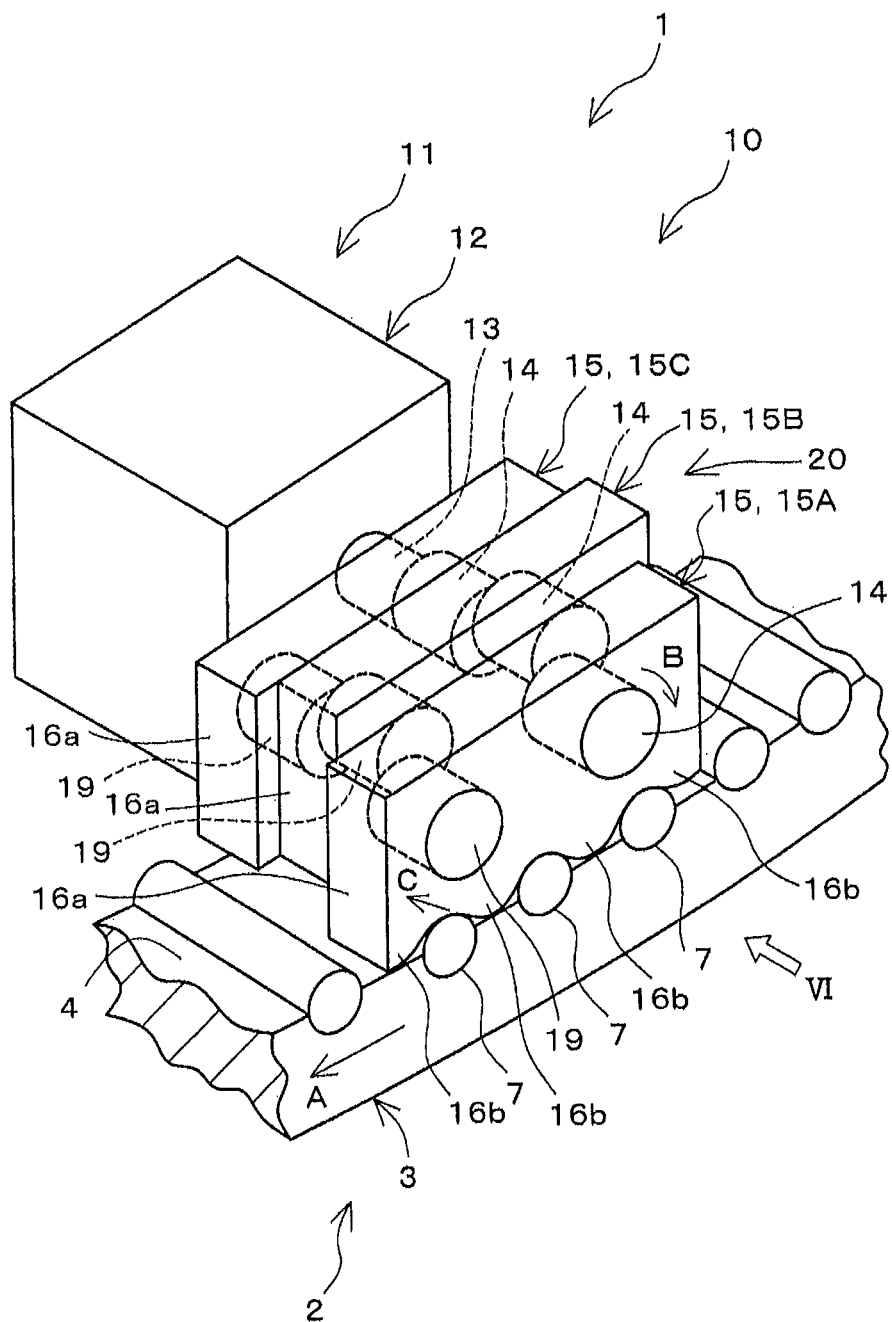
FIG. 5 is a perspective view schematically showing a constitution of a driving unit.

FIG. 5 is a perspective view schematically showing a constitution of the driving unit 10. As shown in FIG. 5, each driving unit 10 includes an electric motor 11 and a swinging unit 20 having a plurality of swinging parts 15 (three swinging parts 15 in this embodiment). Namely, the rotation driving mechanism for windmill 1 according to this embodiment includes the three swinging units 20 and the three electric motors 11. In FIG. 5, illustration of the upper piece parts 6a and the lower piece parts 6b is omitted.

The electric motor 11 includes a body part 12 having a stator and a rotor (both illustration omitted), and a rotating shaft 13 that is rotated when the rotor is rotated with respect to the stator in the body part 12. The body part 12 is fixed with respect to the nacelle 103. In FIG. 5, the size of the electric motor 11 with respect to the swinging parts 15 and the shape of the electronic motor 11 are schematically shown.

FIG. 6 is a view seen from a direction of an arrow VI in FIG. 5, showing only the rotating shaft 13 and a plurality of first eccentric parts 14 (three eccentric parts 14 in this embodiment) integrally provided on the rotating shaft 13. As shown in FIGS. 5 and 6, the rotating shaft 13 is provided integrally with the first eccentric parts 14.

Each eccentric part 14 has a discoid shape having a predetermined thickness. As shown in FIG. 6, the respective first eccentric parts 14 are integrally provided on the rotating shaft 13, such that a central axis of each first eccentric part 14 is eccentric to a central axis of the rotating shaft 13, and that phases of the first eccentric parts 14 are shifted from one another at equal intervals (at intervals of 120°).

FIG. 7 is a plan view showing a schematic shape of the swinging part 15. Each swinging part 15 has a substantially rectangular planar shape. Each swinging part 15 includes a swinging part body 16a which is a portion having a rectangular planar shape, and a plurality of second teeth 16b (four second teeth 16b in this embodiment) that are formed in one long edge of the swinging part body 16a to be meshed with the above-described first teeth 7. The swinging part body 16a and the second teeth 16b are formed integrally with each other. An interval (pitch) between the second teeth 16b in the longitudinal direction of the swinging part 15 is the same as a pitch between the first teeth 7. As shown in FIG. 7, a distal portion of the second tooth 16b has a curvilinear shape in plan view. A portion between the adjacent second teeth 16b has a rounded shape in which the first tooth 7 is fitted in plan view. These second teeth 16b form a meshing part 16d to be meshed with a part of the plurality of first teeth 7.

Each swinging part 15 has two through-holes (first through-hole 17 and second through-hole 18) passing therethrough in a thickness direction. The two through-holes 17 and 18 are larger than an outer shape of the first eccentric part 14. The two through-holes 17 and 18 are formed to be spaced apart from each other in a longitudinal direction of the swinging part 15. Each first eccentric part 14 is inserted into each first through-hole 17. The first eccentric part 14 is rotatable while sliding with respect to an inner circumferential surface of the first through-hole 17. A second eccentric part 19, which will be described in detail below, is inserted into each second through-hole 18.

Similarly to the first eccentric parts 14, the three second eccentric parts 19 are formed integrally with each other. The second eccentric part 19 is formed to have the same strength as that of the first eccentric part 14. Similarly to the first eccentric parts 14 (see FIG. 6), the three second eccentric parts 19 are formed integrally with each other such that phases thereof are shifted from one another at equal intervals (at intervals of 120°). Each second eccentric part 19 is inserted into each second through-hole 18 such that the second eccentric part 19 is rotated slidably in contact with an inner circumferential wall of each second through-hole 18.

Operation

Next, an operation of the aforementioned rotation driving mechanism for windmill 1 is described with reference to FIG. 5 and so on. In the rotation driving mechanism for windmill 1, when the nacelle 103 is turned in one circumferential direction (direction shown by arrow A), the rotating shaft 13 of the electric motor 11 of each driving unit 10 is rotated (normally rotated) in one direction (direction shown by arrow B). Then, the three first eccentric parts 14 integrally provided on the rotating shaft 13 are rotated, with maintaining the phase difference of 120 degrees thereamong. At this time, the three second eccentric prats 19 are rotated, with maintaining the phase difference of 120 degrees thereamong. The rotation of second eccentric parts 19 is in synchronization with the rotation of first eccentric parts 14. As a result, the three swinging parts 15 are swung. In other words, the three swinging parts 15 translate along a circumferential path about the central axis of the rotating shaft 13. The plurality of second teeth 16b of at least one swinging part 15 (swinging part 15A in the state shown FIG. 5) of the three swinging parts 15, which are swung by the respective first eccentric parts 14, are meshed with the plurality of first teeth 7 in the ring gear 2. Thus, when the electric motor 11 is normally rotated, the second teeth 16b of any one of swinging parts 15 (swinging part 15A in the state shown FIG. 5) of each driving unit 10 push (urge) the first teeth 7 to move in a direction shown by an arrow C in FIG. 5. Thus, the driving unit 10 and the nacelle 103, on which the driving unit 10 is fixed, slightly move in the direction shown by the arrow A.

When the swinging part 15A moves in the direction shown by the arrow C, the swinging part 15A moves away from the ring gear 2. However, at this time, the second teeth 16b of the succeeding swinging part 15B are meshed with the first teeth 7 of the ring gear 2. Then, similar to the swinging part 15A, the swinging part 15B moves in the direction shown by the arrow C. Thus, the driving unit 10 and the nacelle 103 slightly move in the direction shown by the arrow A. When the swinging part 15B moves away from the ring gear 2, the succeeding swinging part 15C is meshed with the first teeth 7 of the ring gear 2. Thus, by performing an operation similar to the above, the driving unit 10 and the nacelle 103 further move in the direction shown by the arrow A. When the swinging part 15C moves away from the ring gear 2, the swinging. part 15A is again meshed with the ring gear 2.

In this manner, in the driving unit 10, the three swinging parts 15 repeatedly perform the above-described operations in turn. Thus, the driving unit 10 moves along the one circumferential direction of the ring gear 2 (the direction shown by the arrow A). As a result, the nacelle 103 on which the driving units 10 are fixed is rotated with respect to the tower 102 in which the ring gear 2 is formed.

As described above, when the second teeth 16b push (urge) the first teeth 7, the first teeth 7 pushed (urged) by the second teeth 16b are rotated with respect to the grooves 5 in which the first teeth 7 are accommodated. Thus, a frictional force is reduced by the slidable contact between the second teeth 16b and the first teeth 7.

Effect

As described above, in the rotation driving mechanism for windmill 1 according to the above embodiment, since the rotating shaft 13 of the electric motor 11 is rotated so that the plurality of swinging parts 15 are swung with maintaining a predetermined phase difference thereamong, the swinging parts 15 are moved along the circumferential direction of the ring gear 2 provided in the tower 102. Thus, the nacelle 103, which is a structure on which the swinging parts 15 are fixed, is rotated with respect to the tower 102.

During the rotation of the nacelle 103, the second teeth 16b of any one of the swinging parts 15 in the driving unit 10 are meshed with the first teeth 7 at any timing. Namely, in the rotation driving mechanism for windmill 1 according to this embodiment, upon rotation of the nacelle 103, the number of meshed teeth between the swinging unit 20 and the ring gear 2 can be increased. Thus, since a stress acting on a contact portion between the first teeth 7 and the second teeth 16b can be reduced, the risk in which the rotation driving mechanism 1 is damaged can be reduced, and a mechanism strength can be enhanced. In addition, according to this constitution, since the number of meshed teeth can be increased, it is not necessary to enlarge the mechanism in size in order to elongate a mechanism life expectancy and to improve a drive transmission capacity.

As a result, according to this embodiment, a small-size rotation driving mechanism for windmill 1 having an excellent durability and an excellent drive transmission capacity can be provided.

In addition, in the rotation driving mechanism for windmill 1, since the first teeth 7 are rotatably held by the inner circumferential wall 4, a frictional force can be reduced by the slidable contact between the first teeth 7 and the second teeth 16b. In addition, due to the constitution in which the first teeth 7 are rotatably held by the inner circumferential wall 4, it is possible to omit a heat treatment step, which is required when a large size gear having teeth formed integrally with a discoid portion or an annular portion is manufactured. A heat treatment of a large component is expensive, and plants capable of performing such a heat treatment are few. Thus, by omitting the heat treatment step, a step resulting in increase in cost of a product can be omitted.

In addition, in the rotation driving mechanism for windmill 1, the swinging parts 15 can be swung along the inner circumferential wall 4 of the ring gear, which also functions as the inner race part 106b of the bearing 106. Namely, the existing inner race part 106b of the bearing 106 can be used as the track part (annular track part) for the swinging parts 15.

In addition, as in the rotation driving mechanism for windmill 1, since the pin members rotatable with respect to the respective grooves 5 formed in the inner circumferential wall 4 are provided as the first teeth 7 of the annular track part, the first teeth 7 can be easily made rotatable with respect to the inner circumferential wall 4 with such a simple constitution.

In addition, in the rotation driving mechanism for windmill 1, since the nacelle 103 can be rotated by the plurality of swinging. units 20, a load that acts during its rotation can be dispersed to the plurality of driving units 10. Thus, the risk in which the driving units 10 are damaged can be reduced.

In addition, in this embodiment, the rotation driving mechanism for windmill 1 can be used as a yaw driving mechanism for rotating the nacelle 103 with respect to the tower 102.

The embodiment of the present invention has been described as above, but the present invention is not limited to the above embodiment. The present invention can be variously modified within the scope of the claims. For example, the following modification examples are possible.

Figure 8:
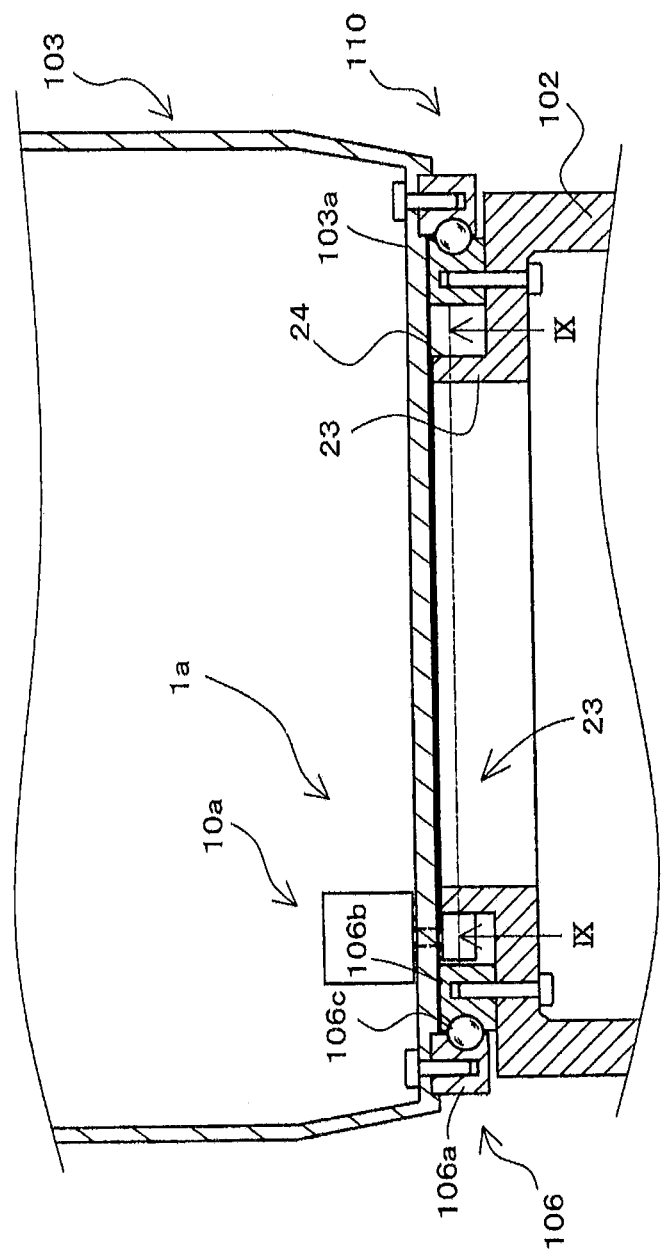
FIG. 8 is a view for explaining the rotation driving mechanism for windmill according to a modification example, correspondingly to FIG. 2.
Figure 9:
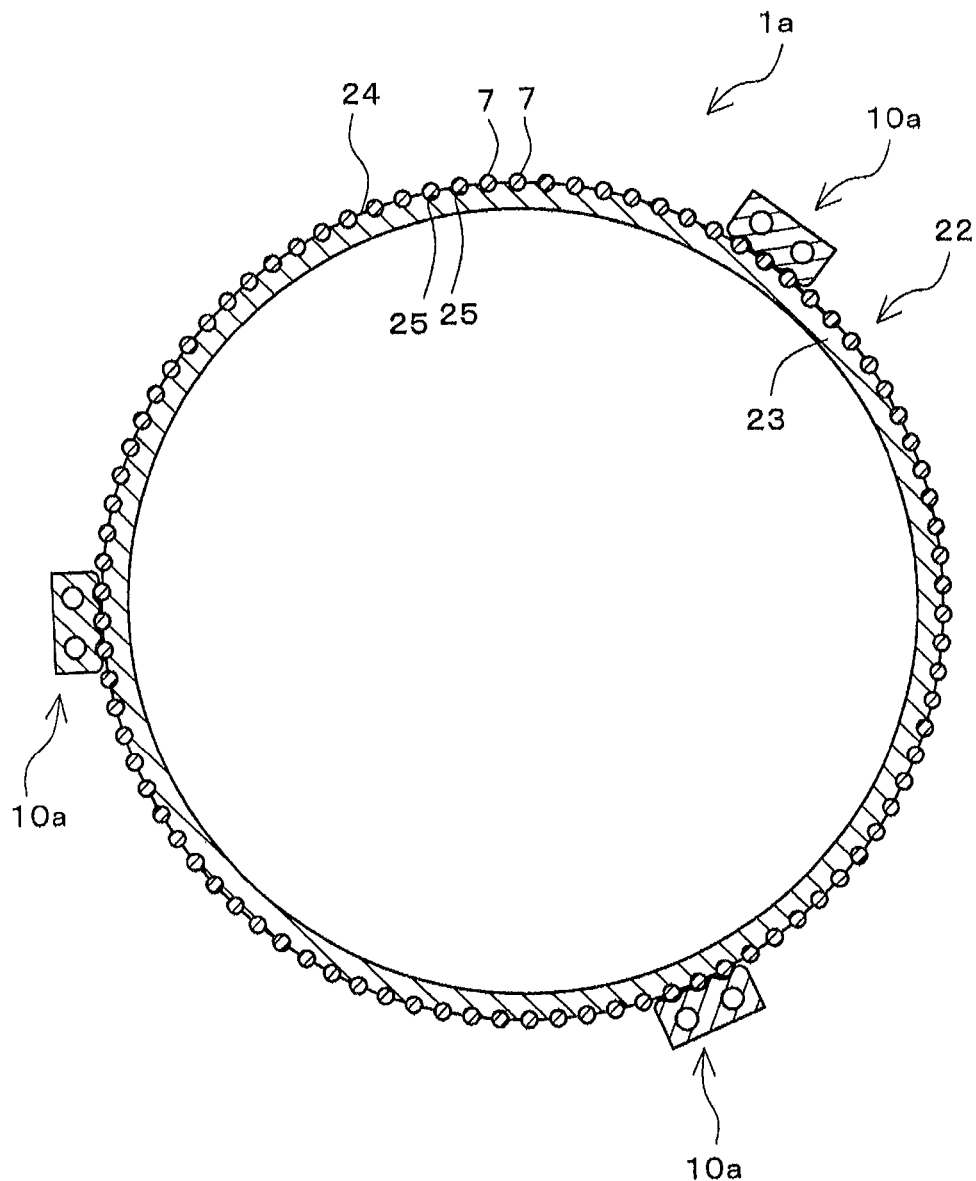
FIG. 9 is a sectional view of FIG. 8 taken along a IX-IX line, correspondingly to FIG. 3.

(1) FIG. 8 is a view for explaining the rotation driving mechanism for windmill is according to a modification example, correspondingly to FIG. 2. FIG. 9 is a sectional view of FIG. 8 taken along a IX-IX line, correspondingly to FIG. 3. In the above embodiment, the driving unit 10 is moved along the inner circumferential side of the ring gear as a circumferential wall part. However, the present invention is not limited thereto. Specifically, the driving unit 10 may be moved along the outer circumferential side of the circumferential wall part.

In this modification example, as shown in FIGS. 8 and 9, a cylindrical wall 23 extending slightly upward from a tower body 102a is formed on an upper end of the tower body 102a at a position on the inner circumferential side of a bearing 106. Similar to the above embodiment, an outer circumferential wall 24 of the cylindrical wall 23 is provided with a plurality of grooves 25 each extending in a direction in which the cylindrical wall 23 stands (a central axis direction of the outer circumferential wall 24). Similarly to the above embodiment, first teeth 7 formed of pin members are accommodated in the respective grooves 25 such that the first teeth 7 are rotatable while sliding with respect to the grooves 25. In this modification example, a ring gear 22 serving as a track part along which the driving units 10a are moved is composed of the above-described cylindrical wall 23 and the first teeth 7.

The driving units 10a according to this modification example are moved along the outer circumferential side of the ring gear 2 as formed above. Thus, since it can be prevented that an excessive stress is generated locally between the driving units 10a and the ring gear 22, the risk in which the rotation driving mechanism for windmill 1 is damaged can be reduced. Since a constitution and an operation of the driving unit 10a are similarly to those of the above embodiment, description thereof is omitted.

(2) FIG. 10 is a view schematically showing a driving unit 10b (excluding an electric motor) of the rotation driving mechanism for windmill according to a modification example. In the above embodiment, the second teeth 16b of the driving unit 10 are provided integrally with the swinging part body 16a, and the first teeth 7 of the ring gear 2 are provided rotatably with respect to the ring part 3. However, the present invention is not limited thereto. For example, as shown in FIG. 10, rollers 26 serving as the second teeth may be provided rotatably with respect to a rotating shaft part 21 fixed on the swinging part body 16c, and first teeth 7a of a ring gear 2a may be provided integrally with a ring part 3a.

According to this modification example, during the movement of a swinging part 15a along the circumferential direction of a ring gear 2a, when the rollers 26 of the swinging part 15a push (urge) the first teeth 7a, the rollers 26 are rotated. Thus, it can be restrained that a pushing force (an urging force) of the rollers 26 to the first teeth 7a concentrates on a contact portion between the rollers 26 and the first teeth 7a. Therefore, similarly to the above embodiment, the risk in which the rotation driving mechanism for windmill is damaged can be reduced.

(3) FIG. 11 is a view schematically showing a driving unit 10c (excluding an electric motor) of the rotation driving mechanism for windmill according to a modification example. In the above embodiment, in each swinging part 15 that is arranged such that the longitudinal direction thereof extends along the circumferential direction of the ring gear 2, the two eccentric parts 14 and 19 are arranged to be spaced apart from each other in the longitudinal direction of the swinging part 15. However, the present invention is not limited thereto. Specifically, as shown in FIG. 11, in each swinging part 15b that is arranged such that the longitudinal direction thereof extends along the radial direction of the ring gear 2 (height direction of the tooth 7), the two eccentric parts 14 and 19 may be arranged to be spaced apart from each other in the longitudinal direction of the swinging part 15b. Such a constitution can also move the driving unit 10c with respect to the ring gear 2.

(4) In the above embodiment, the outer circumferential walls of the respective eccentric parts 14 and 19 are slidably in contact with the inner circumferential walls of the respective through-holes 17 and 18. However, not limited thereto, bearings such as needle bearings may be provided between the eccentric part 14 and the through-hole 17, and between the eccentric part 19 and the through-hole 18.

(5) FIG. 12 is a view schematically showing a rotation driving mechanism for windmill 1b according to a modification example, wherein the rotation driving mechanism for windmill 1b is applied to the hub 104 as the base-side structure and the blade 105 as the rotation-side structure. In the above embodiment, the rotation driving mechanism for windmill is applied to the tower 102 as the base-side structure and the nacelle 103 as the rotation-side structure. However, not limited thereto, the rotation driving mechanism for windmill according to the present invention may be applied to the hub 104 as a base-side structure and the blade 105 as a rotation-side structure, for example.

In the rotation driving mechanism for windmill 1b according to this modification example, as shown in FIG. 12, a driving unit 10d attached to the hub 104 is swung with respect to a ring gear 2b fixed on the blade 105. Thus, the blade 105 can be rotated with respect to the hub 104.

(6) In the above embodiment and the above modification examples, the first teeth 7 are held rotatably width respect to the circumferential wall part, or the rollers 26 serving as the second teeth are held rotatably with respect to the swinging part body 16c. However, not limited thereto, the first teeth may be formed integrally with the circumferential wall part, and the second teeth may be formed integrally with the swinging part body.

INDUSTRIAL APPLICABILITY

The present invention can be used in a windmill including a base-side structure and a rotation-side structure that is rotatable with respect to the base-side structure. The present invention can be widely applied as a rotation driving mechanism for rotating the rotation-side structure with respect to the base-side structure.

What is claimed is:

1. A rotation driving mechanism for windmill for use in a windmill including a base-side structure and a rotation-side structure that is rotatable with respect to the base-side structure, so as to rotate the rotation-side structure with respect to the base-side structure, the rotation driving mechanism for windmill comprising:
    an annular track part provided in one structure of the base-side structure and the rotation-side structure, the annular track part having a circumferential wall part, and first teeth that are arranged along a circumferential direction of the circumferential wall part such that a facewidth direction of each first tooth extends along a direction in parallel with a central axis direction of the circumferential wall part;
    a rotation driving part having a rotatable rotating shaft, the rotation driving part being fixed on the other structure of the base-side structure and the rotation-side structure; and
    a swinging unit including swinging parts each having a meshing part to be meshed with a part of the first teeth, and a swinging part body provided with the meshing part, wherein the swinging parts are arranged along the facewidth direction of the first teeth, and the swinging unit is configured to be relatively moved with respect to the annular track part in a circumferential direction of the annular track part, when the rotating shaft is rotated so that the swinging parts are swung with maintaining a predetermined phase difference thereamong,
    wherein the meshing part includes second teeth to be meshed with the first teeth.

2. The rotation driving mechanism for windmill according to claim 1, wherein
    the first teeth are rotatably held with respect to the circumferential wall part, or the second teeth are rotatably held with respect to the swinging part body.

3. The rotation driving mechanism for windmill according to claim 1, wherein:
    the annular track part has an inner circumferential wall serving as the circumferential wall part.

4. The rotation driving mechanism for windmill according to claim 1, wherein:
    the annular track part has an outer circumferential wall serving as the circumferential wall part.

5. The rotation driving mechanism for windmill according to claim 1, wherein:
    the circumferential wall part is provided with grooves arranged along the circumferential direction of the circumferential wall part such that a longitudinal direction of each groove extends along the direction in parallel with the central axis direction of the circumferential wall part, each groove having a bottom part whose sectional shape in a plane perpendicular to the longitudinal direction is circular arc shape; and
    each of the first teeth is accommodated in one groove of the grooves such that the facewidth direction of the first tooth extends along the longitudinal direction of the groove, each of the first teeth being pin member that is rotatable while sliding with respect to the one groove.

6. The rotation driving mechanism for windmill according to claim 1, wherein:
    the second tooth is a roller that is rotatable about a shaft part attached to the swinging part body such that an axial direction thereof extends along the facewidth direction.

7. The rotation driving mechanism for windmill according to claim 1 further comprising:
    a plurality of the swinging units; and
    a plurality of the rotation driving parts that are correspondingly provided on the respective swinging units, so as to swing the swinging parts of the respective swinging units.

8. The rotation driving mechanism for windmill according to claim 1, which is used in a tower as the base-side structure, and a nacelle as the rotation-side structure.

* * * * *